Nov. 18, 1924.
G. W. CURTIS
1,516,083
ROLLER CONVEYER
Filed Sept. 26, 1923
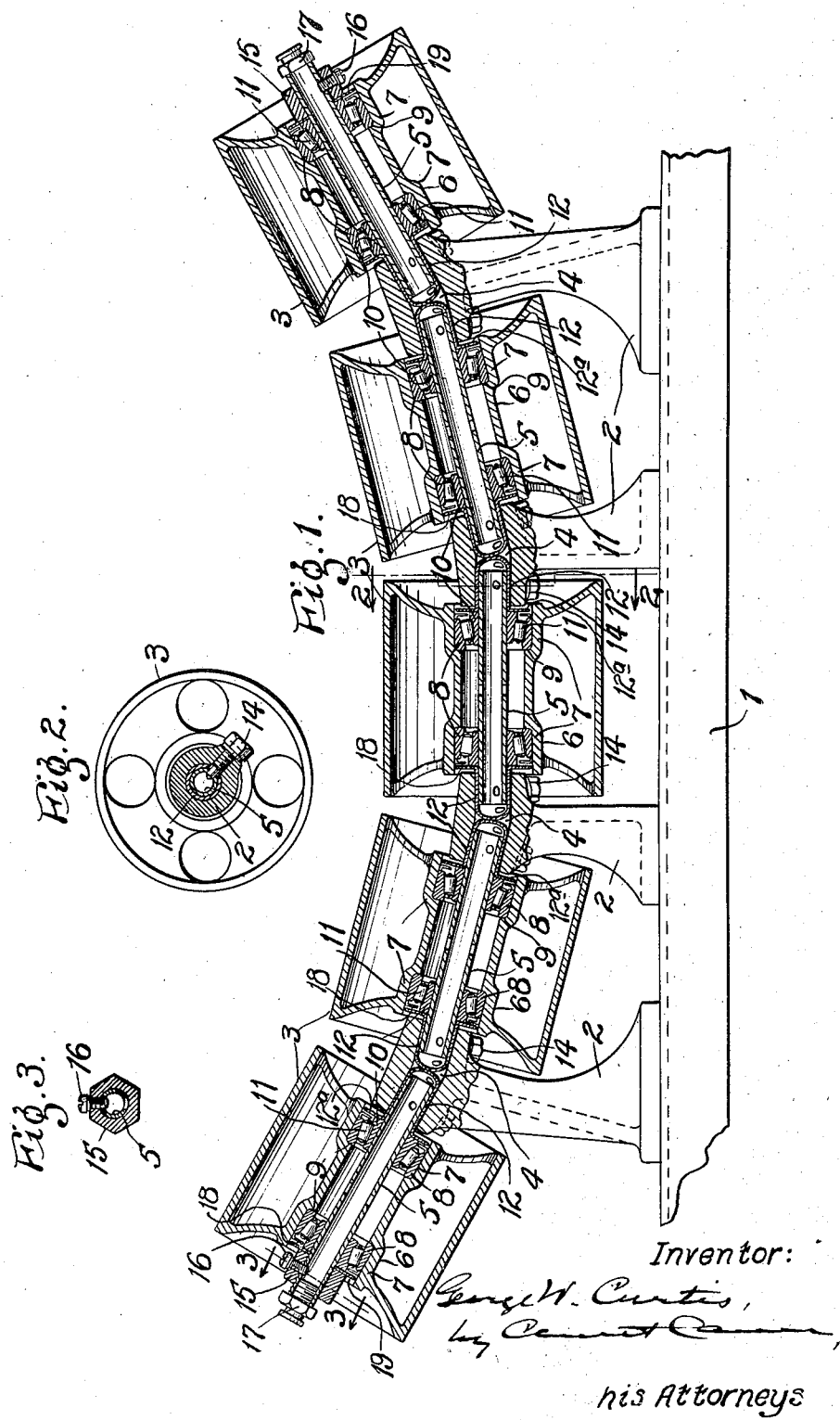
Inventor:
George W. Curtis,
by Cement Cem
his Attorneys Patented Nov. 18, 1924.

1,516,083

UNITED STATES PATENT OFFICE.

GEORGE W. CURTIS, OF CANTON, OHIO, ASSIGNOR TO THE TIMKEN ROLLER BEARING COMPANY, OF CANTON, OHIO, A CORPORATION OF OHIO.

ROLLER CONVEYER.

Application filed September 26, 1923. Serial No. 664,849.

*To all whom it may concern:*

Be it known that I, GEORGE W. CURTIS, a citizen of the United States, and a resident of the city of Canton, in the county of Stark and State of Ohio, have invented a new and useful Improvement in Roller Conveyers, of which the following is a specification.

My invention relates to roller conveyers, and has for its principal object an anti-friction bearing construction for such conveyers in which the bearing and rollers may be easily adjusted. Further objects of the invention are to devise means for lubricating the bearings and means for permitting easy removal and replacement of any worn parts.

The invention consists principally in mounting the bearings of each set of conveyer rollers so that the adjustment of all of the bearings may be made from the endmost bearing. The invention further consists in the parts and combinations of parts hereinafter described and claimed.

In the accompanying drawing,

Fig. 1 is a sectional view of a set of conveyer rollers embodying my invention, the supports therefor being shown in elevation;

Fig. 2 is a sectional view on the line 2—2 of Fig. 1; and

Fig. 3 is a sectional view on the line 3—3 of Fig. 1.

Mounted on a suitable base 1 are brackets 2 that support a set of conveyer rollers 3. In the drawing a set of five conveyer rollers 3 is shown. The brackets 2 have recesses 4 in which are disposed the ends of tubes 5 on which the conveyer rollers are mounted. The end rollers are supported at one end only, the outer ends being free.

The conveyer rollers 3 are shown as hollow webbed members with a central hub 6. The hub member 6 has enlarged openings 7 at the ends adapted to receive the cup 8 of a conical roller bearing, said cups abutting against shoulders 9 at the inner end of the openings in which they rest. Mounted on the tubes 5 are roller bearing cones 10, and a set of conical anti-friction rollers 11 is interposed between each pair of cups and cones.

Mounted on the ends of the tubes 5 that extend into the brackets are thimbles 12 or spacing members each of which has a flanged end 12ª that abuts against the end of a roller bearing cone 10. The ends of adjacent thimbles 12 abut against each other in the bracket recesses, and thus serve to locate the rollers properly and hold them in position endwise. The thimbles 12 and ends of the tubes 5 have holes therethrough into which extend the ends of screws 14 that are mounted in the brackets 2. The holes in the tubes are of the exact size required to fit the screws 14, so that said tubes are held against movement in every direction. The holes in the thimbles 12 are considerably larger than the screws 14, so that movement of the thimbles is permitted.

Mounted on the outer end of each of the outermost bearings is an adjusting nut 15 that is provided with a screw 16 for holding it in position. Turning said adjusting nut moves the endmost cone on its tube 5 and thus adjusts the bearing. When the outermost bearing is adjusted, continued turning of the adjusting nut moves the entire outermost bearing along the tube carrying the end conveyer roller with it, and thus the force is transmitted to the cup of the second bearing and said second bearing is adjusted. By means of the contacting thimbles, further turning of the adjusting nut adjusts the first bearing of the adjacent conveyer roller, and further turning carries the adjustment to the next bearing. In this way all of the bearings may be adjusted by turning the adjusting nut at either end of the set. In practice, adjustment is made from each end of the set toward the middle, instead of making the whole adjustment from one end.

The end of each outer tube 5 is closed by a grease-retaining screw 17 of the ordinary type used in pressure lubrication. The tubes are perforated at about their middles to permit lubricant to escape therefrom on to the roller bearings. The thimbles are perforated to permit lubricant to pass from one tube to the next tube; so that all of the roller bearings may be lubricated by means of lubricant inserted at the ends of the roller set. The flanged ends of the thimbles serve as lubricant retainers; and in addition thereto there is interposed between each thimble end and the adjacent bearing cup a flanged member 18 that also serves to retain lubricant. A washer 19 is preferably interposed between each adjusting nut 15 and the adjacent bearing cone.

The conveyer is assembled as follows;

One of the inner supporting brackets 2 is placed in position, and the end of the tube 5 that supports the middle conveyer roller 3 with the bearing members 8, 10, 11, roll 3, thimbles 12, and grease retainers 18 correctly assembled thereon is placed in position. The other inner supporting bracket 2 is then placed in position; and then the next assembled conveyer rollers 3 are inserted in place. The outer brackets are then put in position and the endmost conveyer rollers placed therein. The screws 14 are then turned so that all of the tubes are properly secured in position; and then the supporting brackets are firmly secured to the base. Adjustments of the bearings and lubrication thereof are accomplished as hereinbefore described.

The roller conveyer hereinbefore described has numerous advantages. The conveyer rollers are properly spaced and located by means of the thimbles. The roller bearings are easily adjusted; so that looseness of the parts may be prevented. In case of damage to any part, it may easily be removed and another part inserted in its place. Obviously numerous changes may be made without departing from the invention and I do not wish to be limited to the precise construction shown.

What I claim is:

1. A conveyer construction comprising a series of axles disposed end to end, a conveyer roller on each of said axles, roller bearings interposed between each axle and its conveyer roller, and thimbles interposed between the opposing ends of said axles said thimbles abutting against each other and each thimble abutting against a race member of one of said roller bearings, whereby said conveyer rollers and bearings may be adjusted.

2. In a conveyer construction, a series of axles disposed end to end, a conveyer roller on each of said axles, roller bearings interposed between each axle and the ends of its conveyer roller, and means for adjusting all of said roller bearings, said means including a single adjusting instrument for the said series of rollers and bearings.

3. In a roller conveyer construction, a series of axles disposed end to end, a conveyer roller on each of said axles, each conveyer roller having a hub portion, conical roller bearings interposed between said hub portions and the respective axles, thimbles mounted on said axles, the thimbles of each axle abutting against the thimbles of adjacent axles.

4. In a roller conveyer construction, a series of axles disposed end to end, a conveyer roller on each of said axles, each conveyer roller having a hub portion, conical roller bearings interposed between the ends of said hub portions and the respective axles, thimbles mounted on the opposing ends of said axles, the thimbles of each axle abutting against the thimbles of adjacent axles, the end of each of said thimbles bearing against the inner bearing member of a roller bearing, and means for moving the inner bearing members of the endmost roller bearings along their axles thereby to adjust said endmost roller bearings and the other roller bearings in series.

5. In a roller conveyer construction, a series of axles disposed end to end, a conveyer roller on each of said axles, each conveyer roller having a hub portion, roller bearings interposed between said hub portions and the respective axles, thimbles mounted on the opposing ends of said axles and abutting against each other, the end of each of said thimbles bearing against the inner bearing member of a roller bearing, and means for moving the inner bearing member of the endmost roller bearing along its axle, thereby to adjust said endmost roller bearing and the other roller bearings in series.

6. In a roller conveyer construction, a series of axles disposed end to end, a conveyer roller on each of said axles, each conveyer roller having a hub portion with enlarged end openings and adjacent shoulders, conical roller bearings interposed between the ends of said hub portions and the respective axles, the outer bearing members bearing against said shoulders, thimbles mounted on the opposing ends of said axles and abutting against each other, the end of each of said thimbles bearing against the inner bearing member of a roller bearing, and an adjusting nut bearing against the inner bearing member of each of the end roller bearings, whereby the end roller bearings and the other roller bearings may be adjusted in series by said adjusting nut.

7. In a roller conveyer construction, a plurality of supporting brackets, a series of axles disposed end to end with their ends mounted in openings provided therefor in said brackets, means for securing said brackets and axles in position, a conveyer roller on each of said axles, each conveyer roller having a hub portion with enlarged end openings and shoulders adjacent thereto, conical roller bearings interposed between the axles and the ends of the hub portions of the conveyer rollers, the outer bearing member of each roller bearing being disposed in one of said enlarged openings and abutting against the adjacent shoulder of the hub portion of a conveyer roller, thimbles slidably mounted on the opposing ends of said axles and abutting against each other, each thimble having a portion abutting against the end of an inner bearing member of a roller bearing, an adjusting nut threaded on the end of the endmost axle and bearing against the inner bearing member of the endmost roller bearing whereby the endmost roller bearing and the other roller bearings may be adjusted serially by said adjusting nut.

8. In a roller conveyer construction, a plurality of supporting brackets, a series of axles disposed end to end with their ends mounted in openings provided therefor in said brackets, means for securing said brackets and axles in position, a conveyer roller on each of said axles, each conveyer roller having a hub portion with enlarged end openings and shoulders adjacent thereto, conical roller bearings interposed between the axles and the ends of the hub portions of the conveyer rollers, the outer bearing member of each roller bearing being disposed in one of said enlarged openings and abutting against the adjacent shoulder of the hub portion of a conveyer roller, thimbles slidably mounted on the opposing ends of said axles and abutting against each other, each thimble having a portion abutting against the end of an inner bearing member of a roller bearing, an adjusting nut threaded on the end of the endmost axle and bearing against the inner bearing member of the endmost roller bearing whereby the endmost roller bearing and the other roller bearings may be adjusted serially by said adjusting nut and means for locking said adjusting nut in position.

9. In a roller conveyer construction, a plurality of supporting brackets, a series of axles disposed end to end with their ends mounted in openings provided therefor in said brackets, means for securing said brackets and axles in position, a conveyer roller on each of said axles, each conveyer roller having a hub portion with enlarged end openings and shoulders adjacent thereto, conical roller bearings interposed between the axles and the ends of the hub portions of the conveyer rollers, the outer bearing member of each roller bearing being disposed in one of said enlarged openings and abutting against the adjacent shoulder of the hub portion of a conveyer roller, thimbles slidably mounted on the opening ends of said axles and abutting against each other, each thimble having a portion abutting against the end of an inner bearing member of a roller bearing, and an adjusting nut threaded on the end of each of the endmost axles and bearing against the inner bearing member of the endmost roller bearing whereby the endmost roller bearings and the other roller bearings may be adjusted serially by said adjusting nuts.

10. A roller conveyer construction comprising a series of conveyer rollers disposed end to end, said rollers having a bore therethrough, spacing members interposed between the ends of said rollers with their ends abutting against each other, each spacing member having a flange adapted and arranged to substantially close the end of the bore of a roller.

11. In a roller conveyer construction, series of axles disposed end to end, a conveyer roller on each of said axles, each conveyer roller having a hub portion, roller bearings interposed between said hub portions and the respective axles, and thimbles mounted on opposing ends of said axles and abutting against each other, each of said thimbles having a flanged end bearing against the inner bearing member of a roller bearing, and forming a closure for the hub portion of the conveyer roller.

Signed at Canton, Ohio, this 18th day of September 1923.

GEORGE W. CURTIS.